T. C. SCHULTZE.
MACHINE FOR MAKING MOLDS.
APPLICATION FILED MAY 3, 1915.

1,285,417.

Patented Nov. 19, 1918.
4 SHEETS—SHEET 1.

WITNESSES:
Anthony Vander Noot
Henrietta K. Vander Myde
Ganson Taggart

INVENTOR
Theodore C. Schultze
BY
Cyrus W. Rice
his ATTORNEY

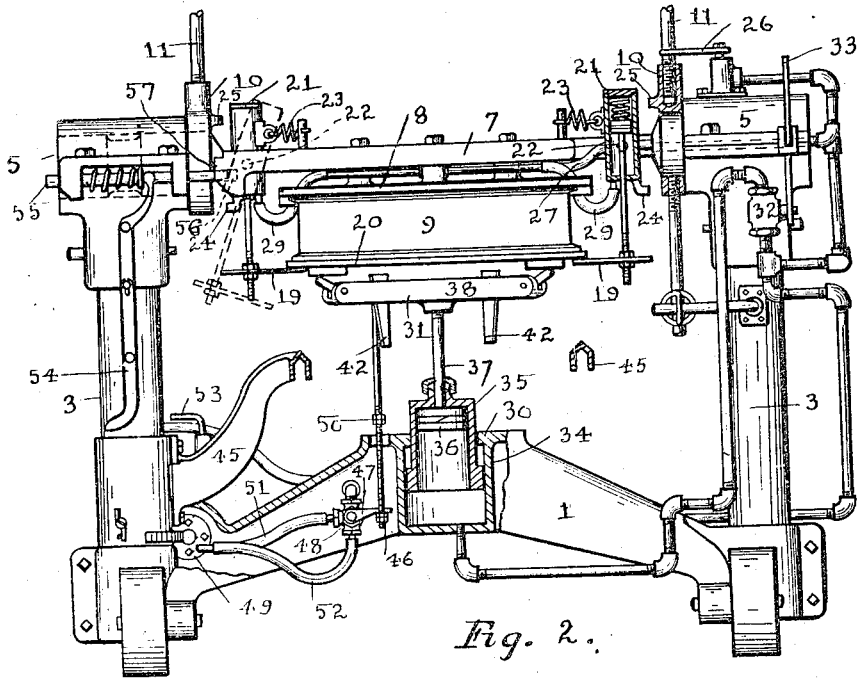
Fig. 2.
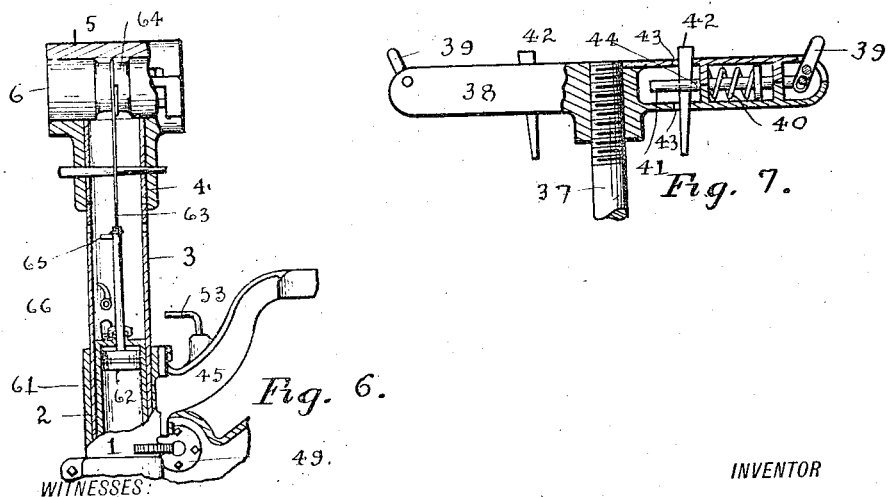
Fig. 6.
Fig. 7.
INVENTOR
Theodore C. Schultze
BY
Cyrus W. Rice
his ATTORNEY

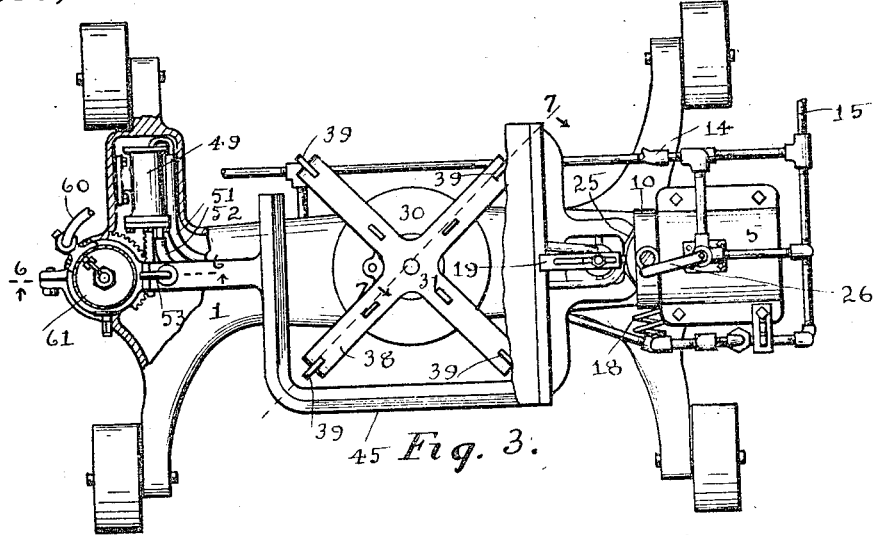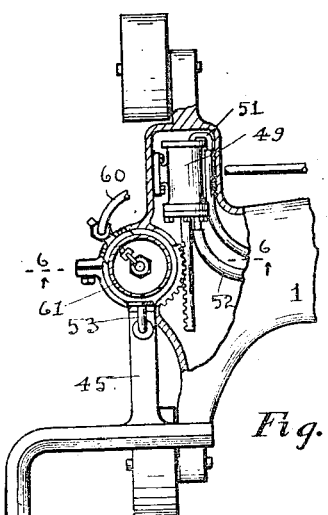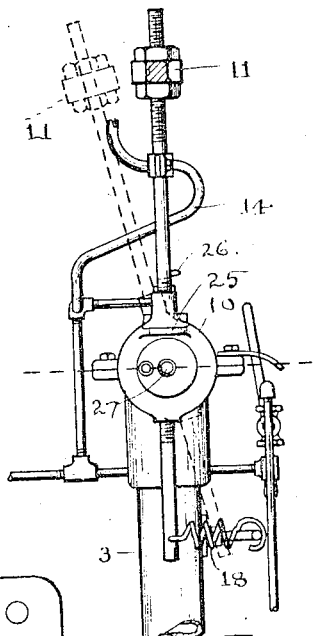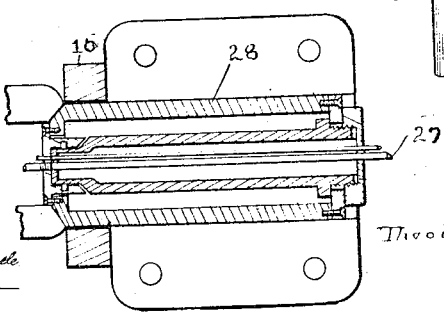

T. C. SCHULTZE.
MACHINE FOR MAKING MOLDS.
APPLICATION FILED MAY 3, 1915.

1,285,417.

Patented Nov. 19, 1918.
4 SHEETS—SHEET 4.

WITNESSES:

INVENTOR
Theodore C. Schultze
BY
his ATTORNEY

UNITED STATES PATENT OFFICE.

THEODORE C. SCHULTZE, OF GRAND RAPIDS, MICHIGAN.

MACHINE FOR MAKING MOLDS.

1,285,417. Specification of Letters Patent. Patented Nov. 19, 1918.

Application filed May 3, 1915. Serial No. 25,637.

*To all whom it may concern:*

Be it known that I, THEODORE C. SCHULTZE, a citizen of the United States, residing at Grand Rapids, in the county of Kent and State of Michigan, have invented new and useful Improvements in Machines for Making Molds, of which the following is a specification.

The present invention relates to machines for making molds, and its objects are to provide such a machine having improved means for operating its mold compressor; and further, such a machine having an improved movable frame for such compressor; and further, such a machine having an improved movable clamp for the mold's bottom board; and further, such a machine having such a clamp automatically movable; and further, such a machine having a mold-carrying table reversible on a rotary bearing through which means extend for operating the clamps for the mold's bottom board; and further, such a machine having an improved equalizing support for the mold's bottom board; and further, such a machine having improved means for operating said equalizing support; and further, such a machine having an improved mold-conveyer and improved means for operating the same; and further, such a machine having means for operating the conveyer in connection with the bottom board's support; and further, such a machine having improved means for holding the reversible mold-carrying table against movement; and further, to provide automatically acting means for controlling such holding means; and further, to provide such a machine having means for reversing such reversible table; and further, to provide automatically acting means for such reversing; and further, to provide such a machine having such features in various combinations; and further, to provide such a machine having an improved frame construction. These, and any other objects hereinafter appearing, are attained, by and the invention finds preferable embodiment in, the structure hereinafter described and illustrated by the drawings, in which:

Fig. 2 is a like view of the same with the mold-carrying table reversed;

Fig. 3 is a section of the same on planes corresponding with line 3—3 of Fig. 1;

Fig. 4 is a fragmentary like view showing parts in another position;

Fig. 5 is a fragmentary view showing certain parts viewed as a section of Fig. 1 on line 5—5 thereof;

Fig. 6 is a sectional view of certain parts on a plane corresponding to line 6—6 of Figs. 3 and 4;

Fig. 7 is a sectional view of certain parts on line 7—7 of Fig. 3;

Fig. 8 is an axial section of a bearing for the reversible table;

Figure 1:
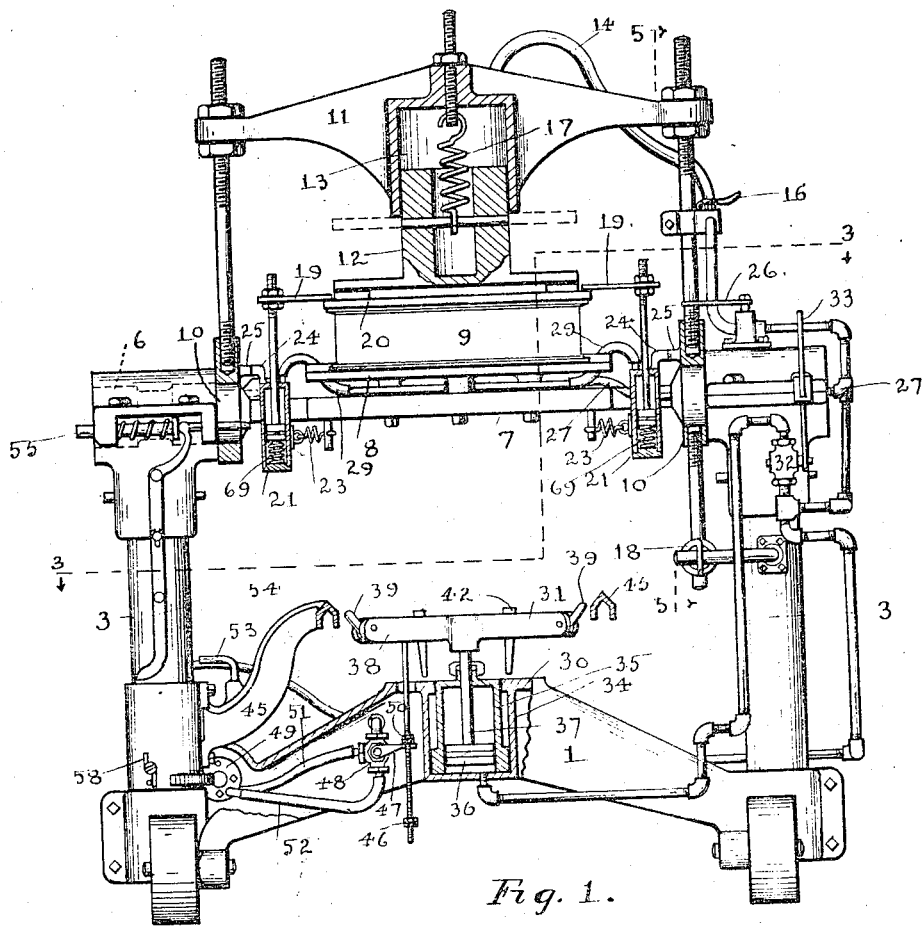
Figure 1 is a front view of a machine for making molds, certain parts being broken away.
Figure 9:
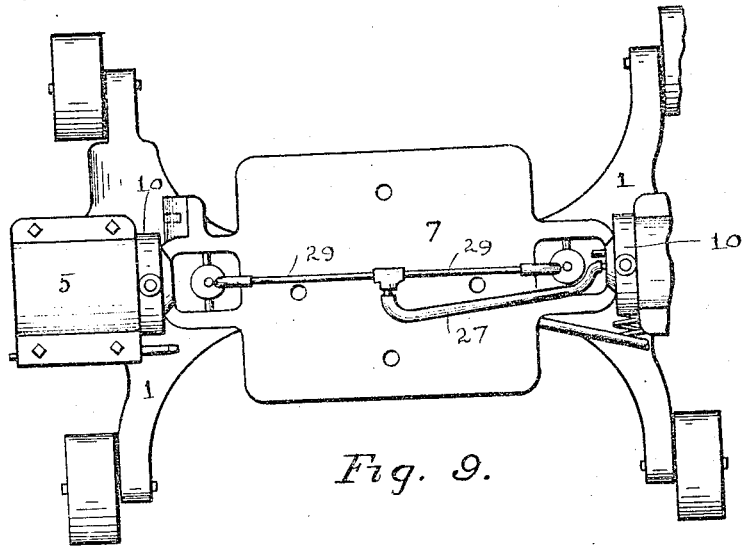
Fig. 9 is a plan view of the parts immediately below the mold-supporting member of the reversible table.
Figure 10:
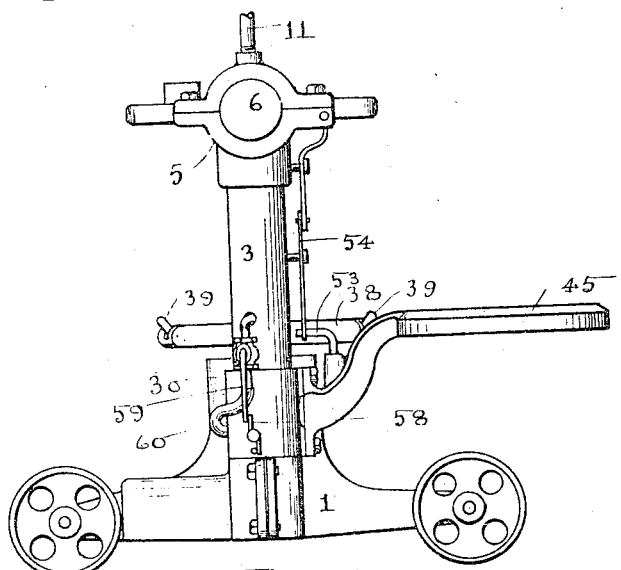
Fig. 10 is a fragmentary left-hand side view of the machine.

In the embodiment of the invention chosen for illustration by the drawings, and for detailed description herein, the base 1 is provided with sockets 2 in which are seated at their lower ends, tubular posts 3, such posts being seated at their upper ends in similar sockets 4 in the rotary bearing-members 5 for the spindles 6 and 28 of the reversible mold-carrying table 7. Both posts are thus seated, although only one is so shown. This table has a mold-supporting member or "pattern plate" 8 on which rests the form or "flask" 9 of the mold. Pivoted concentrically with the spindles 6 and 28, on bearings 10, is a movable frame 11 swinging on such bearings and carrying a mold-compressor or "squeezer" comprising a compressed-air operated plunger 12 in its air cylinder 13, to which air is supplied by a pipe 14 leading from a suitable supply pipe 15. The cock 16 is normally open to allow the air to escape from the cylinder, whereupon the spring 17 raises or retracts the plunger: but it is turned to admit air to the cylinder to operate the compressor. It will be seen that after the compressor's action and the retraction of its plunger, the frame may be swung (its spring 18 acting as a counterbalance) to the position shown in dotted lines in Fig. 5, to carry the compressor out of its operable position, whereupon the table and the mold may be readily reversed or turned upside down to the position shown in Fig. 2.

Suitable clamps 19 for the mold's "bottom board" 20 are operated by compressed air by means of their cylinders 21 pivoted at 22 on the table, on an axis transverse to that of the table's reversing movement. These clamps are turned on such pivots against their springs 23, into their operable position, by their cams 24 engaging the cams 25 of the compressor frame, as said frame is swung into its upright position shown in solid lines in the views. This frame in thus swinging engages and opens the two-way cock 26, thereby admitting the air to the clamp's cylinders through the pipe 27 (extending through the hollow spindle 28,) and the branches 29 to the clamps; and upon the air being allowed to escape from the clamp's cylinders by turning the cock to another position, the springs 69 release the clamps.

The compressor's frame being swung to the position shown in dotted lines in Fig. 5, and the clamps holding the bottom board in position, the table and the mold are reversed as shown in Fig. 2. Compressed air is now admitted to the cylinder 30 operating the equalizing support 31 for the mold's bottom board, by turning the cock 32 by its lever 33. This cylinder has telescopic cylinder members 34 and 35 and a vertically movable piston 36 with a piston rod 37 carrying a frame 38. This frame has a plurality of bottom board supporting members 39 pivotally mounted thereon and inclined from the vertical as shown. Springs 40 press these members toward the vertical, and plungers 41 are connected to such members. As the frame rises and the supporting members yieldingly engage the bottom board, the springs are compressed, and the wedges 42, slidable in slots 43 in the frame and 44 in the plungers, are allowed to descend by gravity; and when the frame descends with the mold resting on said members, the wedges hold such members in their position supporting the mold; but after the mold has been deposited on the conveyer 45, the lower ends of the wedges, by striking the base of the machine in the continued descent of said frame, are loosened and moved upwardly relatively to the plunger, and are then held in such position by the springs until the next operation of the support on the bottom board of the mold.

The pattern is fastened to the plate 8, and when the frame 38 with the mold descends, the mold is with-drawn by such movement from the pattern.

As the equalizing support rises, its lug 46 engages the cock 47 of the two-way valve 48 to admit compressed air to the cylinder 49 in order to swing the conveyer inwardly into position to receive the mold from the equalizing support; and as such support descends, its lug 50 engages said cock to turn the same to its other position wherein it admits air to the other end of the cylinder in order to swing the conveyer outwardly; air being supplied through the pipes 51 and 52 to the respective ends of the cylinder. As the conveyer swings outwardly, its lug 53 engages the compound lever 54, which retracts the bolt or movable catch 55 from a pit or keeper 56 in the radially extending face 57 of the table, in which pit such bolt engages in order to lock the table against turning movement. This done, the continued swinging movement of the conveyer causes its trigger 58 to engage a cock 59 and open its valve to admit compressed air from the pipe 60 to the cylinder 61 containing a piston 62, whose action is to draw the strap or flexible member 63 wound on the drum 64 of the spindle 6, thereby reversing the table to its position shown in Fig. 1. As the piston descends, its lug 65 strikes the cock 66 which opens an exhaust from the cylinder.

The invention being intended to be defined solely in and by the claims, I do not propose to confine myself to the details of construction as shown or described.

I claim:

1. In a machine of the character described, a mold-carrying table, and a mold compressor comprising an air-operated compressing plunger movable toward the table in its compressing operation and a spring adapted to retract said plunger after its operation, said table being reversible relatively to said compressor.

2. In a machine of the character described, a reversible mold-carrying table, a mold compressor, a frame for such compressor movable relatively to the table and adapted to carry the compressor into and out of its operable position, a clamp for the mold's bottom board movable relatively to the table into its operable position, and means for so moving the clamp by the movement of said frame.

3. In a machine of the character described, a reversible mold-carrying table, a mold compressor, a frame for such compressor pivotally mounted relatively to the table and adapted to carry the compressor into and out of its operable position, and a clamp for the mold's bottom board pivotally mounted relatively to the table and movable into its operable position by the engagement of said frame therewith.

4. In a machine of the character described, a reversible mold-carrying table, a mold compressor, a frame for such compressor movable relatively to the table and adapted to carry the compressor into and out of its operable position, a clamp for the mold's bottom board movable relatively to the table into its operable position, and means for so moving the clamp by the movement of said frame.

5. In a machine of the character described, a reversible mold-carrying table, a mold compressor, a frame for such compressor pivotally mounted relatively to the table and adapted to carry the compressor into and out of its operable position, a clamp for the mold's bottom board pivotally mounted relatively to the table and movable into its operable position by the engagement of said frame therewith, and means actuated by the frame's movement for operating the clamp.

6. In a machine of the character described, a reversible mold-carrying table, a mold compressor, a frame for such compressor pivotally mounted relatively to the table and adapted to carry the compressor into and out of its operable position, a clamp for the mold's bottom board pivotally mounted relatively to the table on an axis transverse to that of said frame and movable into its operable position by the engagement of said frame therewith.

7. In a machine of the character described, a mold-carrying table rotatably supported on a hollow journal, an air-controlled clamp for the mold's bottom board and carried by the table, and an air supply pipe leading through the journal to the clamp.

8. In a machine of the character described, a pivotally mounted swinging mold-conveyer, and air-operated means for swinging the conveyer.

9. In a machine of the character described, a pivotally mounted swinging mold-conveyer, and air-operated means for swinging the conveyer, such means comprising a cylinder having an air-operated piston operably engaging the conveyer.

10. In a machine of the character described, a movable mold-conveyer, air-operated means for moving the conveyer, such means comprising a cylinder having an air-operated piston provided with a rack, and a gear carried by the conveyer intermeshing with the rack.

11. In a machine of the character described, a vertically movable support for the bottom board of a mold, a movable mold-conveyer, and means for automatically moving the conveyer in connection with the vertical movement of said support.

12. In a machine of the character described, a vertically movable support for the bottom board of a mold, an air-operated movable mold-conveyer, and means operable by the vertical movement of said support for controlling the air for moving the conveyer.

13. In a machine of the character described, a reversible mold-carrying table, a movable catch adapted to lock the table in desired position, a movable mold-conveyer, and means operable in connection with the movement of the conveyer for moving the catch.

14. In a machine of the character described, a pivotally mounted reversible mold-carrying table having a radially extending face portion with a keeper, a movable catch adapted to engage the keeper to hold the table against turning movement, a mold-conveyer, and a lever engaging the catch and operable in connection with the movement of the conveyer for moving the catch.

15. In a machine of the character described, a pivotally mounted reversible mold-carrying table having a drum concentric with its pivotal axis, a flexible member wound on the drum and adapted to be drawn to rotate the table, a movable mold-conveyer, and means operable in connection with the movement of the conveyer for drawing the flexible member.

16. In a machine of the character described, a reversible mold-carrying table, a movable mold-conveyer, and means operable in connection with the movement of the conveyer for reversing the table.

17. In a machine of the character described, a reversible mold-carrying table, a movable mold-conveyer, and air-operated means controllable in connection with the movement of the conveyer for reversing the table.

18. In a machine of the character described, a reversible mold-carrying table, a movable catch adapted to lock the table in desired position, a movable mold-conveyer, means operable in connection with the conveyer's movement for moving the catch, and subsequently acting means operable in connection with the conveyer's movement for reversing the table.

19. In a machine of the character described, a base portion having sockets, a reversible mold-carrying table having spindles, bearing members for the table's spindles and having sockets, and tubular posts seated at their lower ends in the bases' sockets and at their upper ends in the bearing members' sockets.

20. In a machine of the character described, a mold-carrying table rotatably supported on a hollow journal, a clamp for the mold's bottom board and carried by the table, and means extending through the journal to operate the clamp.

21. In a machine of the character described, a reversible mold-carrying table, a mold compressor, a frame for such compressor movable relatively to the table and adapted to carry the compressor into and out of its operable position, a clamp for the mold's bottom board movable relatively to the table into its operable position, means for so moving the clamp by the movement of said frame, and means actuated by the frame's movement for operating the clamp.

22. In a machine of the character described, a reversible mold-carrying table, a mold-compressor, a movable arm carrying said compressor, a clamp for the mold's bottom board movable relatively to the table into its operable position, and means for so moving the clamp by the movement of the arm.

23. In a machine of the character described, a reversible mold-carrying table, a mold-compressor, a movable arm carrying said compressor, a clamp for the mold's bottom board movable relatively to the table into its operable position, means for clampingly operating the clamp, and means for initiating the operation of said means by the movement of the arm.

24. In a machine of the character described, a reversible mold-carrying table, a mold-compressor, a movable arm carrying said compressor, a clamp for the mold's bottom board movable relatively to the table into its operable position, means for so moving the clamp by the movement of the arm, means for clampingly operating the clamp, and means for initiating the operation of the secondly-mentioned means by the movement of the arm.

In testimony whereof I have hereunto set my hand in presence of the subscribing witnesses.

THEODORE C. SCHULTZE.

Witnesses:
 CYRUS W. RICE,
 HENRIETTA K. VANDER MYDE,
 GAUSON TAGGART.

Copies of this patent may be obtained for five cents each, by addressing the "Commissioner of Patents, Washington, D. C."